US008620261B2

(12) United States Patent
Goto (10) Patent No.: US 8,620,261 B2
(45) Date of Patent: Dec. 31, 2013

(54) INFORMATION PROCESSING SYSTEM CAPABLE OF CALCULATING COMMUNICATION FEES CORRESPONDING TO COMMUNICATION UTILIZATION FORMS

(75) Inventor: Yukiko Goto, Tokyo (JP)

(73) Assignee: NEC Corporation, Tokyo (JP)

( * ) Notice: Subject to any disclaimer, the term of this patent is extended or adjusted under 35 U.S.C. 154(b) by 1678 days.

(21) Appl. No.: 12/058,308

(22) Filed: Mar. 28, 2008

(65) Prior Publication Data

US 2008/0242263 A1    Oct. 2, 2008

(30) Foreign Application Priority Data

Mar. 30, 2007    (JP) ................................. 2007-092769

(51) Int. Cl.
*H04M 11/00*    (2006.01)
(52) U.S. Cl.
USPC ........... 455/406; 455/405; 455/407; 455/408; 455/409; 379/114.03; 379/114.01; 379/112.07; 379/114.22; 379/114.26; 379/114.05; 379/114.28; 705/40; 705/412; 705/32; 705/30
(58) Field of Classification Search
USPC ................ 455/405–409; 379/114.03, 114.01, 379/112.07, 114.22, 114.26, 114.05, 379/114.28; 705/40, 412, 32, 30
See application file for complete search history.

(56) References Cited

U.S. PATENT DOCUMENTS

| | | | | |
|---|---|---|---|---|
| 5,991,380 A * | 11/1999 | Bruno et al. | ............ | 379/114.15 |
| 6,282,274 B1 * | 8/2001 | Jain et al. | ................. | 379/114.26 |
| 6,631,185 B1 * | 10/2003 | Fleming, III | ............ | 379/121.02 |
| 6,757,371 B2 * | 6/2004 | Kim et al. | ................ | 379/114.22 |
| 6,925,160 B1 * | 8/2005 | Stevens et al. | ........... | 379/121.05 |
| 7,046,988 B2 * | 5/2006 | Kotzin | ......................... | 455/406 |
| 7,426,263 B2 * | 9/2008 | Brown et al. | ............ | 379/114.21 |
| 7,457,608 B2 * | 11/2008 | Shah | ............................ | 455/351 |
| 7,787,879 B1 * | 8/2010 | Philips et al. | .............. | 455/435.1 |
| 7,929,955 B1 * | 4/2011 | Bonner | ......................... | 455/415 |
| 2003/0120594 A1 * | 6/2003 | Shaginaw et al. | .............. | 705/40 |
| 2004/0186812 A1 * | 9/2004 | Back et al. | .................... | 705/412 |
| 2005/0099946 A1 * | 5/2005 | Ito et al. | ....................... | 370/230 |

(Continued)

FOREIGN PATENT DOCUMENTS

JP    2000078129 A    3/2000
JP    2003179705 A    6/2003

(Continued)

OTHER PUBLICATIONS

Japanese Office Action for JP2007-092769 issued May 18, 2011.

*Primary Examiner* — Amancio Gonzalez (57) ABSTRACT

An information processing system of the present invention comprises a storage apparatus storing calculation equations for calculating a communication fee corresponding to an identifier of said information terminal regarding first and second subscription courses whose said particular utilization forms are different each other, and storing subscription information including information on a date and time of starting the first subscription course, and an information processing apparatus connected to the storage apparatus through a network. Upon receipt of information on the second subscription course will be selected instead of the first subscription course and a date and time of starting the second subscription course from the information terminal through the network, the information processing apparatus stores received information in the storage apparatus, and changes the calculation equation for calculating the communication fee based on the date and time of starting the second subscription course.

2 Claims, 9 Drawing Sheets

(56) References Cited

U.S. PATENT DOCUMENTS

2005/0281263 A1* 12/2005 Miyamoto et al. ............ 370/389
2007/0202840 A1*  8/2007 Camp, Jr. ...................... 455/403
2007/0232262 A1* 10/2007 Uematsu et al. .............. 455/406

FOREIGN PATENT DOCUMENTS

| JP | 2003242416 A | 8/2003 |
| JP | 2003248782 A | 9/2003 |
| JP | 2007150378 A | 6/2007 |

* cited by examiner

| telephone number | subscription course | date and time of starting utilization | date and time of ending utilization | valid |
|---|---|---|---|---|
| 11111111111 | A-course | 2006/07/16/00:00 | | O |
| 22222222222 | B-course | 2006/10/01/10:00 | | O |
| 11111111111 | C-course | 2006/06/01/13:00 | 2006/07/16/00:00 | |

Fig.7B

| telephone number | subscription course | date and time of starting utilization | date and time of ending utilization | valid |
|---|---|---|---|---|
| 11111111111 | A-course | 2006/07/16/00:00 | | O |
| 22222222222 | A-course | 2006/11/01/09:00 | | O |
| 22222222222 | B-course | 2006/10/01/10:00 | 2006/11/01/09:00 | |
| 11111111111 | C-course | 2006/06/01/13:00 | 2006/07/16/00:00 | |

Fig. 12 ary object of the invention is to provide an
INFORMATION PROCESSING SYSTEM CAPABLE OF CALCULATING COMMUNICATION FEES CORRESPONDING TO COMMUNICATION UTILIZATION FORMS This application is based upon and claims the benefit of priority from Japanese Patent Application No. 2007-092769 filed on Mar. 30, 2007, the content of which is incorporated by reference.

BACKGROUND OF THE INVENTION

1. Field of the Invention

The present invention relates to an information processing system, an information processing apparatus, a communication fee calculation method, and a program for causing a computer to execute the method for calculating communication fees separately for a plurality of users in accordance with their utilization forms.

2. Description of the Related Art

With technological advancements such as enhanced performance of portable telephone terminals, higher speeds of communications, and the like, a need has increasingly arisen for making use of portable telephone terminals for business in addition to private utilization in recent years. Since an employer will be financially heavily burdened with distributing portable telephone terminals to respective employees for business use, it becomes popular that the employees often utilize their personal portable telephone terminals for business use and the employer pay communication fees for business use to telephone companies. In this case, calculations for communication fees are required separately for private use and business use because a company to which the employees belongs must pay fees for packet communication (hereinafter called "packet communication fees") in business use to the telephone companies and employees must pay packet communication fees in their private use to the telephone companies.

As a technique related to the calculation of two separate packet communication fees in business use and private use, Japanese Patent No. 3142821 (hereinafter called "Patent Document 1") discloses a termination charging method in packet communications and a system for implementing this method. This realizes a so-called "toll-free number" function in the packet communication. Hereinafter, the calculation is called "business/private separate calculation".

On the other hand, JP-2003-179705-A (hereinafter called "Patent Document 2") discloses an example of a method and a system for the business/private separate calculation. In Patent Document 2, a proxy server for the business/private separate calculation is provided between a portable telephone terminal and a content server. While the portable telephone terminal connects with the content server through the proxy server, the amount of packet communication is measured as business use in the proxy server. A packet communication fee for business use is calculated based on the measured packet amount. The user of the portable telephone terminal pays a total packet communication fee to telephone company, and the packet communication fee for business use is paid back the user from a company to which the user belongs.

A variety of courses have been proposed for business/private separate calculation service from portable telephone companies. In one of the courses, the business/private separate calculation defines a predetermined time zone on weekdays for business use, and defines the remaining time zones for private use. In another course, a user previously registers telephone numbers and URLs (Uniform Resource Locators) of web sites utilized for business at a telephone company, and communications to/from the telephone of the registered telephones number and the web sites of the registered URLs are recognized as business use by the telephone company.

Generally, the user of the portable telephone terminal determines which of business/private separate calculation services to select, and the user himself personally subscribes to a portable telephone company. Accordingly, selected courses differ from one user to another, as a result, accounting processing is complicated in an company to which the user belongs.

Also, in some cases, if timing at which the user changes subscription contents of a portable telephone company differs from timing at which a calculation for a packet communication fee is changed in a business/private separate calculation system, it is difficult to calculate a correct packet communication fee actually charged to the user even if amount of a packet communication has been correctly calculated for business use.

In the method of Patent Document 2, the following problem arises when a packet communication fee is calculated from a packet communication amount. Since the objects of the method are portable telephones of which the users personally subscribe to portable telephone companies, subscription contents (for example, subscription courses and the like) between portable telephone companies and users differ from one to another, and thus a different calculation equation is used to calculate a packet communication fee from a packet communication amount from one user to another. Further, timing at which the user changes subscription contents to a portable telephone company can be different from timing at which a calculation equation for calculating a packet communication fee is changed in the business/private separate calculation system. However, the method of Patent Document 2 provides insufficient measures to such situations, and it is difficult to calculate a correct packet communication fee actually charged to a user even if a packet communication amount has been correctly calculated for business use. This problem is similar to the method of Patent Document 1 as well.

Further, when a correct packet communication fee must be calculated, the user must submit what reveals a subscription course to the company to which the user belongs. It takes a lot of effort for the user to black out private portions on a bill which is printed on a sheet in order to hide his private information, and then the user submits the bill to the company. On the other hand, the company must make an employee which engages himself in accounting confirm contents of bills submitted from all users. Particularly, when a user changes from one telephone company to another, the user submits the bill of a different telephone company to the company to which the user belongs, as a result, it takes a lot of effort for the company to confirm the bills.

SUMMARY

An exemplary object of the invention is to provide an information processing system, an information processing apparatus, a communication fee calculation method, and a program for causing a computer to execute, which are capable of calculating a communication fee in a particular utilization form, even if a subscription course is changed, corresponding to before and after the change.

A system according to an exemplary aspect of the invention, for calculating a communication fee in a particular utilization form among a plurality of utilization forms of an information terminal, includes a storage apparatus for storing subscription information including information on a first subscription course which is one type of service for calculating the communication fee in the particular utilization form corresponding to an identifier of the information terminal and a date and time of starting the first subscription course and calculation equations for the first subscription course and a second subscription course which is different from the first subscription course, respectively and an information processing apparatus, connected to the storage apparatus through a network, upon receipt of information on the second subscription course selected instead of the first subscription course and a date and time of starting the second subscription course from the information terminal through the network, for storing information received in the storage apparatus, for recording a communication amount by a communication in the particular utilization form performed by the information terminal and a communication date and time which indicates a date and time at which the communication has been performed in the storage apparatus, for determining whether or not the communication date and time is before the date and time of starting the second subscription course, and for calculating the communication fee by using the communication amount and a calculation equation for the first subscription course when the communication date and time is before the date and time of starting the second subscription course, or for calculating the communication fee by using the communication amount and a calculation equation for the second subscription course when the communication date and time is at or after the date and time of starting the second subscription course.

The above and other objects, features and advantages of the present invention will become apparent from the following description with reference to the accompanying drawings which illustrate examples of the present invention.

DETAILED DESCRIPTION OF THE EXEMPLARY EMBODIMENT

First Exemplary Embodiment

Figure 1:
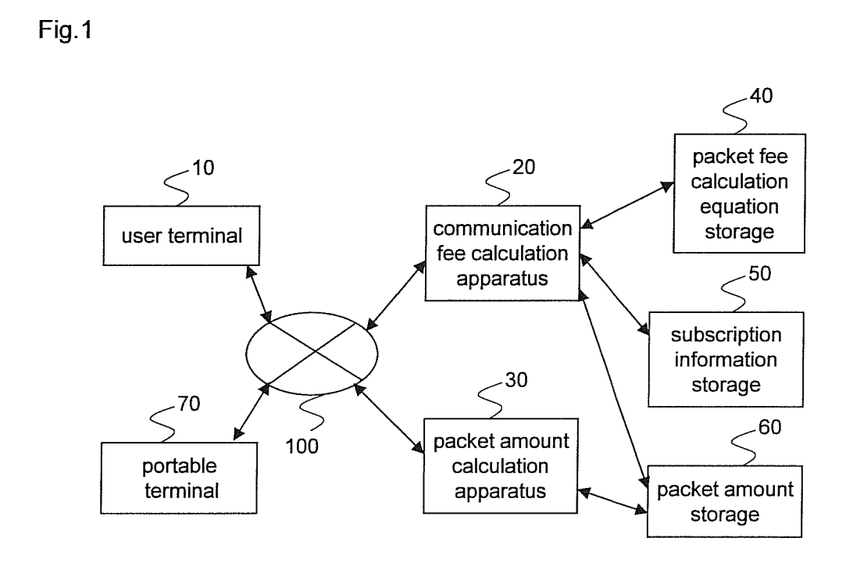
FIG. 1 is a block diagram showing an exemplary configuration of an information processing system according to a first exemplary embodiment.

The configuration of an information processing system according to this exemplary embodiment will be described. FIG. 1 is a block diagram showing an exemplary configuration of the information processing system according to this exemplary embodiment.

As shown in FIG. 1, the information processing system of this exemplary embodiment comprises apparatus 20 which calculates a communication fee, apparatus 30 which calculates amount of packets transmitted, storage 40 which stores information on a calculation equation for calculating a packet communication fee, storage 50 which stores information on a subscription, and storage 60 which stores information of amount of packets transmitted.

Hereinafter, apparatus 20 is called "communication fee calculation apparatus 20", apparatus 30 is called "packet amount calculation apparatus 30", storage 40 is called "packet fee calculation equation storage 40", storage 50 is called "subscription information storage 50", and storage 60 is called "packet amount storage 60". Hereinafter, amount of packets transmitted in a communication is called "a packet communication amount".

Then, communication fee calculation apparatus 20 and packet amount calculation apparatus 30 are communicably interconnected through network 100 such as the Internet, intranet or the like.

Packet amount storage 60 is connected to communication fee calculation apparatus 20 and packet amount calculation apparatus 30, respectively. Packet fee calculation storage device 40 is connected to communication fee calculation apparatus 20, subscription information storage 50 is connected to packet amount calculation apparatus 30. Also, user terminal 10 and portable terminal 70 used by a user are connected to network 100. In the following, each apparatus will be described in detail.

Packet fee calculation equation storage 40 is a storage device such as a recording disk, a database or the like, and stores information on subscription courses of business/private separate calculation services and stores information on calculation equations of packet communication fees corresponding to the subscription courses.

Subscription information storage 50 is a storage device such as a recording disk, database or the like, and stores subscription information which includes the telephone number of the portable terminal. The subscription information, corresponding to the telephone number, includes information on the most recent subscription course applied that is related to the telephone of the telephone number, and information on the date and time of starting the course. Also, information of the course in the subscription information is not limited to the most recent subscription course, it may include information of a course to which the user has subscribed in the past.

Subscription information on a course subscribed in the past includes information on a subscription course, and the date and time of starting the course and the date and time of ending the course, with the telephone number. An example of a record of the subscription information will be shown in description of operation, later described.

Packet amount storage 60 is a storage device such as a recording disk, a database or the like. Then, packet amount storage 60 stores information on a packet communication amount calculated as business use, and the date and time at which the communication was performed, corresponding to information (identifier) to identify portable terminal 70 uniquely. For example, the identifier of portable terminal 70 is the telephone number of the terminal. In the following, the identifier of portable terminal 70 is the telephone number.

Figure 2:
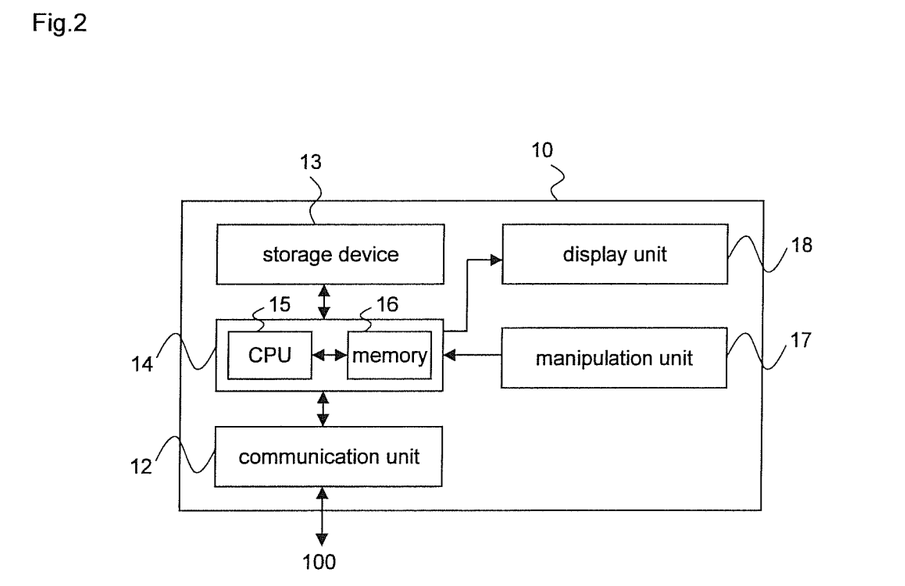
FIG. 2 is a block diagram showing an exemplary configuration of a user terminal.

FIG. 2 is a block diagram showing an exemplary configuration of a user terminal.

User terminal 10 is an information processing apparatus including PDA (Personal Digital Assistant) such as a portable telephone, a portable communication device and the like, and a personal computer. As shown in FIG. 2, user terminal 10 comprises communication unit 12, storage device 13, control unit 14 for controlling each component, manipulation unit 17 for the user to enter instructions, and display unit 18.

Control unit 14 comprises CPU (Central Processing Unit) 15 for executing predetermined processing in accordance with a program, and a memory 16 for storing the program. Since normal functions for transmission/reception of mail and for accessing web page are similar to other related techniques, detailed descriptions thereon are omitted except for portions related to the processing of a method of a communication fee calculation according to the present invention.

When the user selects a subscription course for portable terminal 70, communication unit 12 transmits information required to a subscription of the course to communication fee calculation apparatus 20 through network 100 in response to an instruction from control unit 14. Also, when the user has changed a subscription course with the portable telephone company, communication unit 12 transmits information on the new subscription course and the date and time of starting utilization of the new course to subscription information storage 50 through network 100 and communication fee calculation apparatus 20 in accordance with an instruction from control unit 14.

Portable terminal 70 is a portable telephone terminal for performing packet communications, and is utilized for purposes of business use and private use. A packet communication amount for business use in portable terminal 70 is calculated by packet amount calculation apparatus 30 in accordance with the content of a subscription course selected by the user. Since portable terminal 70 is similar to the configuration shown in FIG. 2 in regard to the configuration for information processing, a detailed description thereon is omitted. Also, since normal functions for phone-call, for transmission/reception of mail, and for accessing web page are similar to other related technique, detailed descriptions thereon are omitted.

Figure 3:
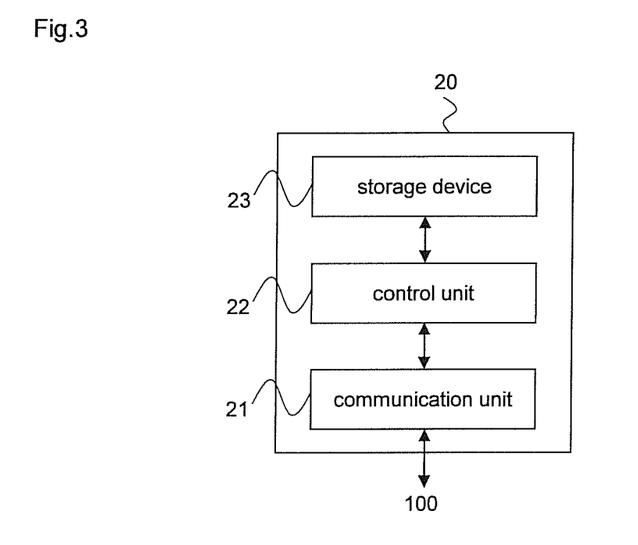
FIG. 3 is a block diagram showing an exemplary configuration of a communication fee calculation apparatus.

FIG. 3 is a block diagram showing an exemplary configuration of the communication fee calculation apparatus.

Communication fee calculation apparatus 20 is an information processing apparatus such as a workstation, a server or the like which is provided in a company to which the user of portable terminal 70 belongs. As shown in FIG. 3, communication fee calculation apparatus 20 comprises communication unit 21, storage device 23, and control unit 22.

Storage device 23 stores information on a web page published on network 100. The web page is provided for the user of portable terminal 70 to subscribe thereon when he receives a business/private separate calculation service for a packet communication fee. The web page provides information on introductions to a plurality of subscription courses, and entry fields for entering items required for the subscription. In the following, this web page is called the "subscription course registration page."

Communication unit 21 receives information required to a subscription to the business/private separate calculation service from user terminal 10 through network 100. When the user changes a subscribed course with the portable telephone company, communication unit 12 receives information on a newly subscribed course and the date and time of starting utilization of the course from user terminal 10 through network 100.

Control unit 22 comprises a CPU (not shown) for executing predetermined processing in accordance with a program, and a memory (not shown) for storing the program.

Control unit 22, upon receipt of information required to a subscription to the business/private separate calculation service, records the subscription information in subscription information storage 50 as the most recently subscribed course in portable terminal 70. In this event, the date and time at which the information required to the subscription is received is recorded together with the course in subscription information storage 50 as the date and time of starting the subscribed course in portable terminal 70.

Control unit 22 also updates the subscription information recorded in subscription information storage 50. Further, Control unit 22 calculates a packet communication fee with reference to the calculation equation recorded in packet fee calculation equation storage 40, the subscription information recorded in subscription information storage 50, and packet amount information recorded in packet amount storage 60.

Figure 4:
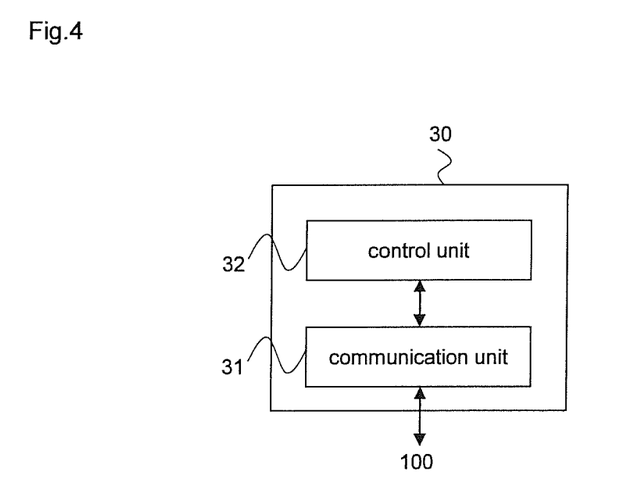
FIG. 4 is a block diagram showing an exemplary configuration of a packet amount calculation apparatus.

FIG. 4 is a block diagram showing an exemplary configuration of the packet amount calculation apparatus.

Packet amount calculation apparatus 30 is an information processing apparatus such as a workstation, a server or the like, which is provided in the company to which the user of portable terminal 70 belongs. As shown in FIG. 4, packet amount calculation apparatus 30 comprises communication unit 31 for transmitting/receiving data to the outside through network 100, and control unit 32.

Control unit 32 comprises a CPU (not shown) for executing predetermined processing in accordance with a program, and a memory (not shown) for storing the program. Control unit 32 calculates a packet communication amount utilized by portable terminal 70 for business use. Also, Control unit 32 records the packet communication amount calculated as business use and the date and time at which the communication was performed in packet amount recording unit 60 in association with the identifier of portable terminal 70.

Figure 5:
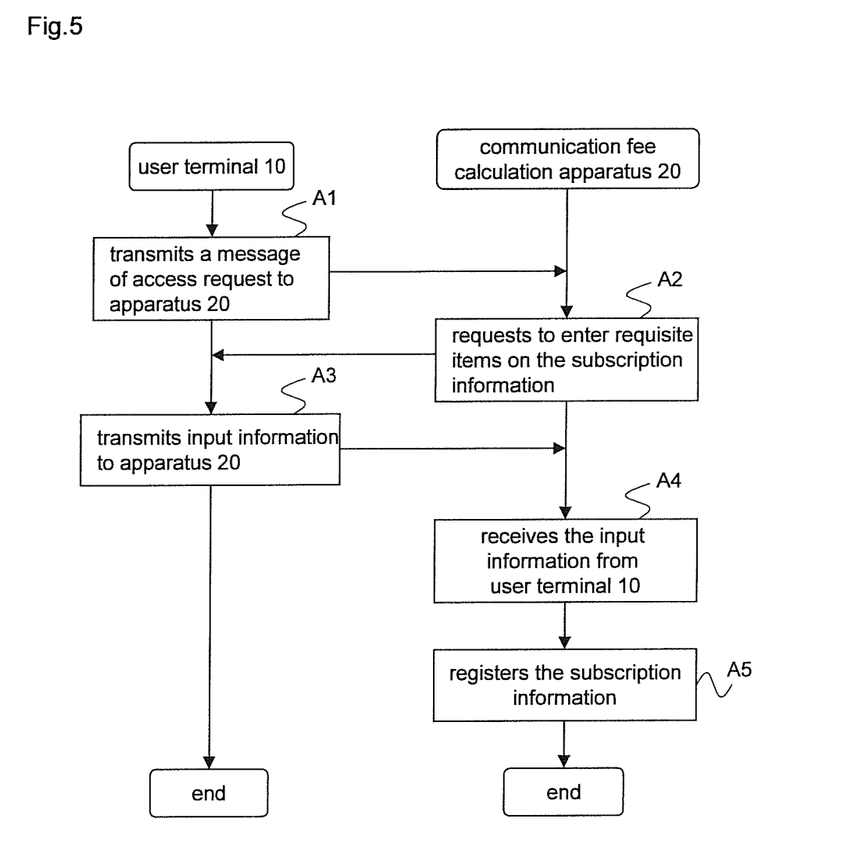
FIG. 5 is a flow chart showing a procedure for registering a subscription course.

Next, a description will be given of a method of registering a subscription course for portable terminal 70 in the information processing system configured as described above. FIG. 5 is a flow chart showing a procedure for registering a subscription course.

As shown in FIG. 5, as the user of portable terminal 70 operates manipulation unit 17 of user terminal 10 to enter a request for an access to the subscription course registration page disclosed through network 100 by communication fee calculation device 20, user terminal 10 transmits a message of access request to communication fee calculation apparatus 20 (step A1).

Upon receipt of the message of access request from user terminal 10, communication fee calculation apparatus 20 transmits to user terminal 10 a message for requesting entry of requisite items and information on the subscription course registration page including the introduction to subscription courses for portable terminal 70 (step A2). Upon receipt of the information on the subscription course registration page and the entry request message from communication fee calculation apparatus 20, user terminal 10 displays the entry request message and the page on display unit 18.

As the user operates manipulation unit 17, while viewing display unit 18, to select a subscription course from a plurality of subscription courses, user terminal 10 transmits input information including information on the selected subscription course to communication fee calculation apparatus 20 (step A3). Communication fee calculation apparatus 20 receives the input information from user terminal 10 (step A4), and then registers the subscription information based on the input information (step A5).

The registration of the subscription information refers to processing of recording the subscription course included in the received input information in subscription information storage 50 as the most recent subscription course in portable terminal 70. In this event, the date and time at which the input information was received is recorded as the date and time of starting the subscription course in portable terminal 70.

In this regard, the input information may include information required for a normal subscription such as telephone number, name or address of the user, and the like, other than the information on the subscription course.

Figure 6:
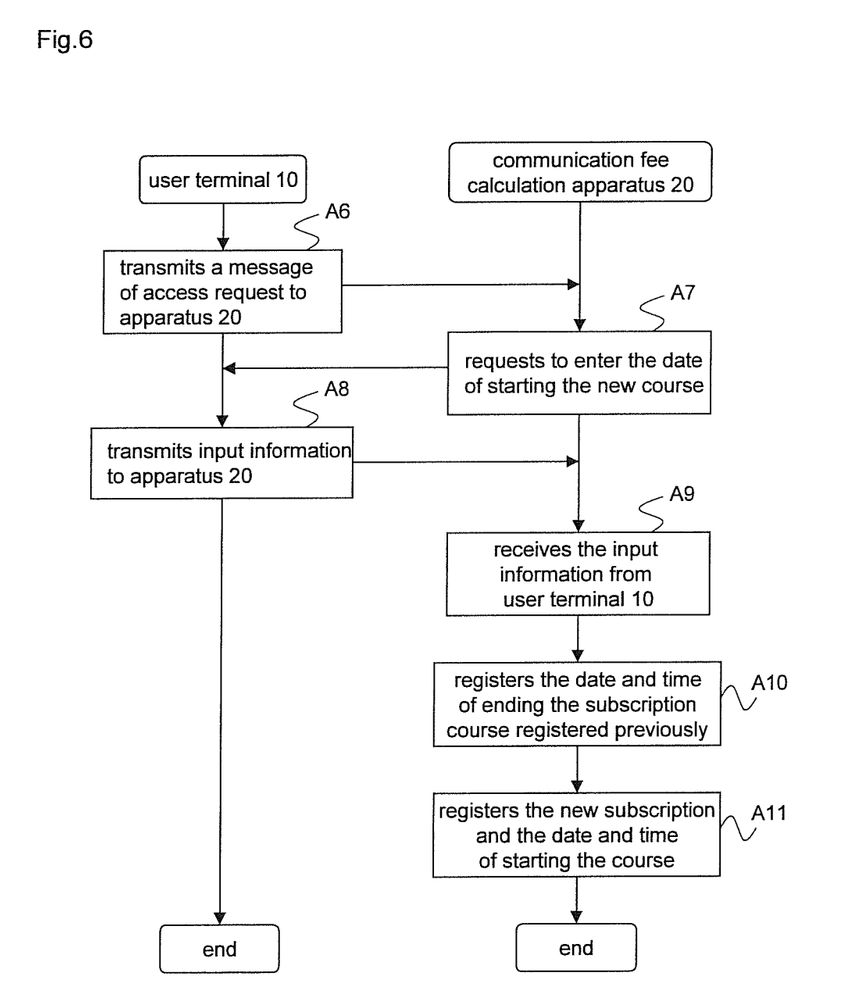
FIG. 6 is a flow chart showing a procedure for changing a subscription course.

Next, a description will be given of a procedure for the user to change a subscription course. FIG. 6 is a flow chart showing a procedure for updating a subscription course.

As shown in FIG. 6, as the user of portable terminal 70 operates manipulation unit 17 of user terminal 10 to enter a request for an access to the subscription course registration page, user terminal 10 transmits a message of access request to communication fee calculation apparatus 20 (step A6).

Upon receipt of the massage of access request from user terminal 10, communication fee calculation apparatus 20 transmits a massage for requesting entry of a new course and date of starting the new course with information on the subscription course registration page including introduction to subscription courses for portable terminal 70, to portable terminal 70 (step A7). Upon receipt of the information on the subscription course registration page with the message for requesting entry of the new course and the date of starting the new course from communication fee calculation apparatus 20, user terminal 10 displays the message for requesting entry of the new course and the date of starting the new course, together with the page, on display unit 18.

As the user operates manipulation unit 17, while viewing display unit 18, to select a new subscription course from a plurality of subscription courses and enter the date of starting the new course, user terminal 10 transmits input information including the selected subscription course and the date of starting the course to communication fee calculation apparatus 20 (step A8). Communication fee calculation apparatus 20 receives the input information from user terminal 10 (step A9), and then performs subscription information update processing based on the input information.

In the subscription information update processing, Communication fee calculation apparatus 20 records 0 a.m. of the date of starting the new course in the input information as the date and time of ending the subscription information registered previously (step A10). Subsequently, Communication fee calculation apparatus 20 records the newly received subscription course in subscription information storage 50 as the most recent subscription course in portable terminal 70. In this event, Communication fee calculation apparatus 20 records 0 a.m. of the data of start the new course in the input information as the date and time of starting the new subscription course in portable terminal 70 (step A11).

In this exemplary embodiment, two subscription courses are switched at 0 a.m. of the date which is entered by the user, but these subscription courses may be switched at date and time at which communication fee calculation apparatus 20 receives information on the new subscription course. Also, the time of starting the new course may also be set by the user.

Through this subscription information update processing, past subscription information is also recorded, together with the most recent subscription information, in subscription information storage 50. Accordingly, even if a change in subscription information differs in timing from a change in communication fee account, it is possible to account the communication fee based on the subscription information at the time when a packet communication was actually performed for business or private use.

In the following, a description will be given of an example of the subscription information recorded in subscription information recording device 50 before and after the subscription information update processing.

Figure 7A:
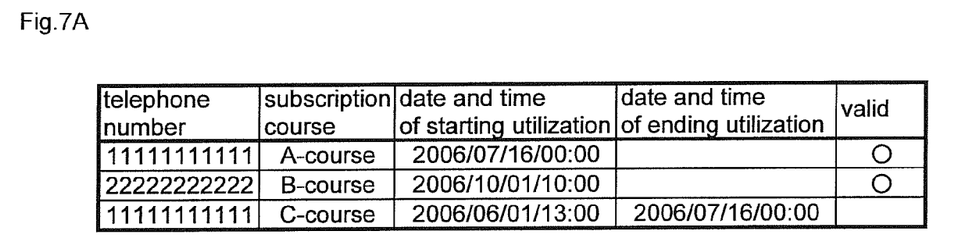
FIGS. 7A and 7B are tables showing exemplary records of subscription information.
Figure 7B:
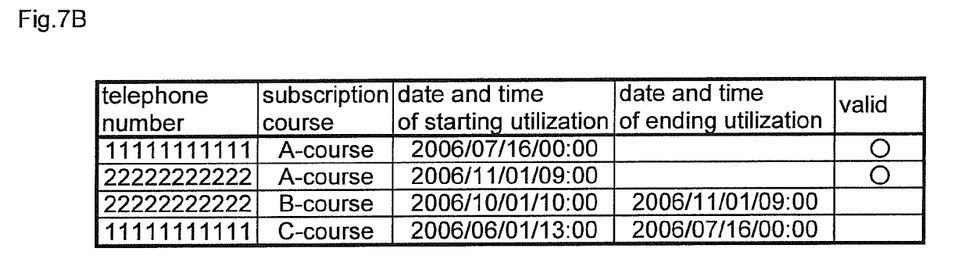

FIGS. 7A and 7B are tables showing exemplary records of subscription information. FIG. 7A shows an example of the subscription information, and FIG. 7B shows an example of updating the subscription information of FIG. 7A.

As shown in FIG. 7A, the subscription information table is provided with columns which indicate subscription course, the date and time of starting utilization, the date and time of ending utilization, and most recently subscribed course corresponding to the telephone number of a portable terminal. The user of a portable terminal, the telephone number of which is "22222222222," changes to A-course, resulting in an update to the subscription information shown in FIG. 7B.

It can be seen from the table shown in FIG. 7B that for the portable terminal with the telephone number "22222222222," B-course ends at 9 o'clock on Nov. 1, 2006, and A-course starts from this time. Then, seeing the column which shows the most recently subscribed course, it can be recognized that the most recent subscription course is A-course because a circle is marked in a field corresponding to A-course of the portable terminal with the telephone number "22222222222."

Figure 8:
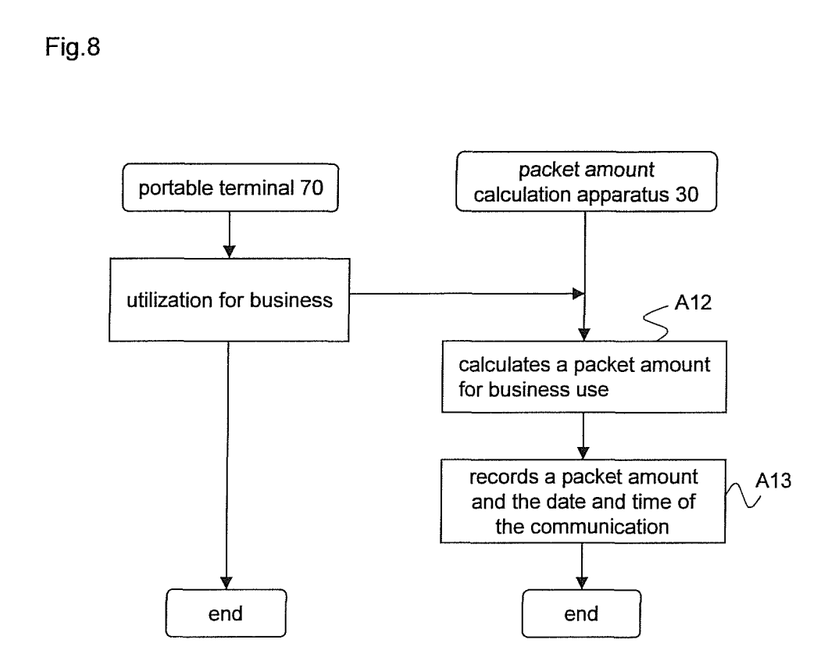
FIG. 8 is a flow chart showing an operation procedure of the packet amount calculation apparatus.

Next, an operation procedure of packet amount calculation apparatus 30 will be shown when portable terminal 70 is utilized by the user. FIG. 8 is a flow chart showing the operation procedure of the packet amount calculation apparatus.

As shown in FIG. 8, when the user utilizes portable terminal 70 for business, packet amount calculation apparatus 30 calculates a packet amount for business use in portable terminal 70 (step A12). In this regard, as a specific method of determining utilization in portable terminal 70 as business use and calculating a packet amount thereof, a method described in Japanese Patent Application No. 2005-337981 can be employed.

Packet amount calculation apparatus 30 records a packet communication amount calculated as business use, the date and time at which the communication was performed, and the telephone number of portable terminal 70 in packet amount storage 60 in association with one another (step A13). Packet amount calculation apparatus 30 repeats the recording each time a packet communication is performed for business use.

Figure 9:
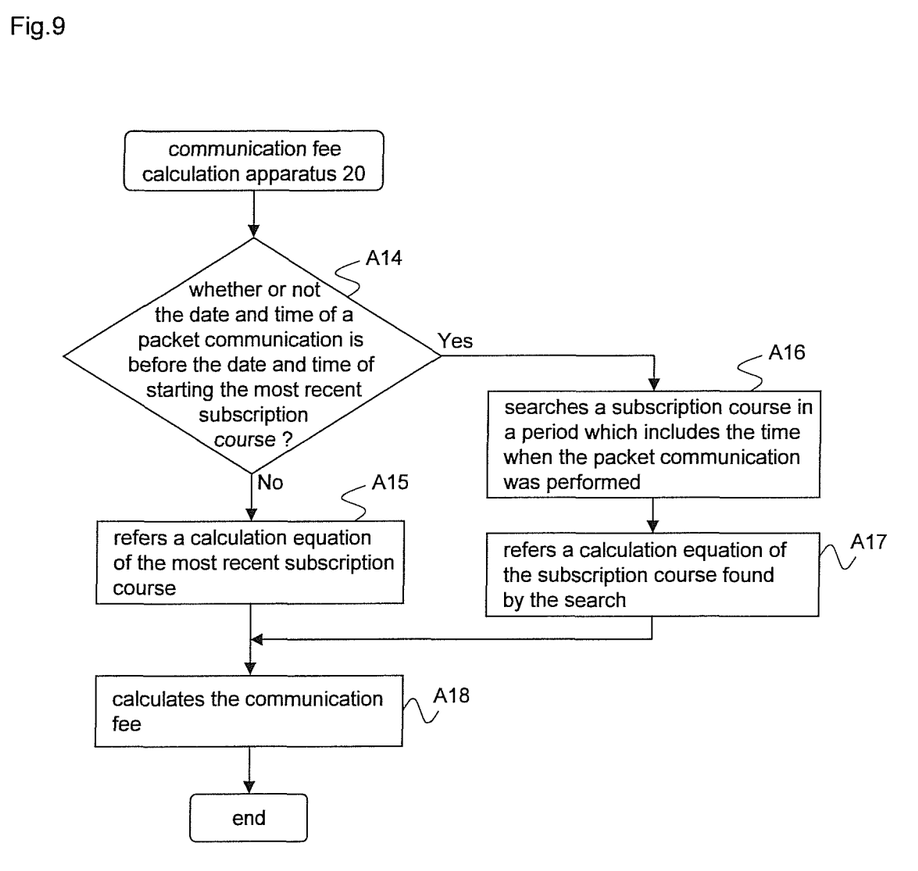
FIG. 9 is a flow chart showing a procedure for calculating a communication fee for business use.

Next, a description will be given of a procedure for the user to calculate a communication fee for business use of portable terminal 70. FIG. 9 is a flow chart showing a procedure for calculating a communication fee for business use.

In the information processing system of this exemplary embodiment, a communication fee can be calculated at a predetermined timing, such as once a month, once a week, everyday, or the like, and this timing may be the same as or different from timing at which the user changes a subscription course with a portable telephone company.

Communication fee calculation apparatus 20 refers a calculation equation recorded in packet fee calculation equation storage 40, the subscription information recorded in subscription information storage 50, and packet amount information recorded in packet amount storage 60 to calculate a packet communication fee at a predetermined timing of calculating the communication fee. In the following, a more specific procedure will be described.

Communication fee calculation apparatus 20 compares the date and time at which portable terminal 70 performed a communication that is recorded in packet amount storage 60 with the most recent subscription information of portable terminal 70 that is recorded in subscription information storage 50. Then, Communication fee calculation apparatus 20 determines whether or not the date and time at which the packet communication was performed is before the date and time of starting the most recent subscription course (step A14).

When the date and time at which the packet communication was performed is at or after the date and time of starting the most recent subscription course, communication fee calculation apparatus 20 refers packet fee calculation equation storage 40, and refers a packet fee calculation equation recorded corresponding to the most recent subscription course, and applies this calculation equation to the packet amount recorded in packet amount recording unit 60 (step A15).

On the other hand, when the date and time at which the packet communication was performed is before the start date and time of the most recent subscription course, communication fee calculation apparatus 20 searches subscription information on courses subscribed in the past for subscription information in a period which includes the date and time at which the packet communication was performed (step A16). If appropriate subscription information is found as a result of the search, communication fee calculation apparatus 20 refers packet fee calculation equation storage 40 to apply a calculation equation which is recorded therein corresponding to the subscription course of the subscription information (step A17). Subsequently, communication fee calculation apparatus 20 calculates the communication fee by using the applied calculation equation (step A18).

Next, effects of this exemplary embodiment will be described.

In this exemplary embodiment, even if a user of the business/private separate calculation service changes a course, upon calculation of a communication fee in a particular utilization form of an information terminal, it is determined whether or not a communication intended for the calculation is before the course change, such that the communication fee is calculated corresponding to courses before and after the change, respectively.

Since the communication fee is calculated using subscription information before an update or subscription information after the update corresponding to the date and time at which a packet communication was performed, it is possible to apply a calculation equation suitable for contents of a subscription at the time the packet communication was performed. In a system for realizing the business/private separate calculation, a packet communication fee for business use can be calculated using an equivalent value to an actually charged communication fee.

Also, as described above, since a value similar to the actually charged communication fee is calculated by an information processing apparatus, the user is not required to submit what reveals subscription information to the company to which the user belongs. Further, the company can save efforts of confirming contents of bills for communication fees submitted by all users.

While communication fee calculation apparatus 20 and packet amount calculation apparatus 30 are provided separately in this exemplary embodiment, the functions of these two units may be integrated into a single information processing apparatus. Also, while packet fee calculation equation storage 40, subscription information storage 50, and packet amount storage 60 are separately provided, one storage apparatus may store information on these three storages. Also, an information processing apparatus may comprise the functions of communication fee calculation apparatus 20 and packet amount calculation apparatus 30 and a storage device which integrates information on these storage devices.

Also, the user may use portable terminal 70 instead of user terminal 10, as an information terminal operated by the user, in the procedures shown in FIGS. 5 and 6.

Second Exemplary Embodiment

In this exemplary embodiment, subscription information is obtained from an information disclosure apparatus which is provided by a portable telephone company, rather than from user terminal 10 to which a user operates to enter subscription information. First and second exemplary embodiments are different in this respect.

A description will be given of the configuration of an information processing system according to this exemplary embodiment.

Figure 10:
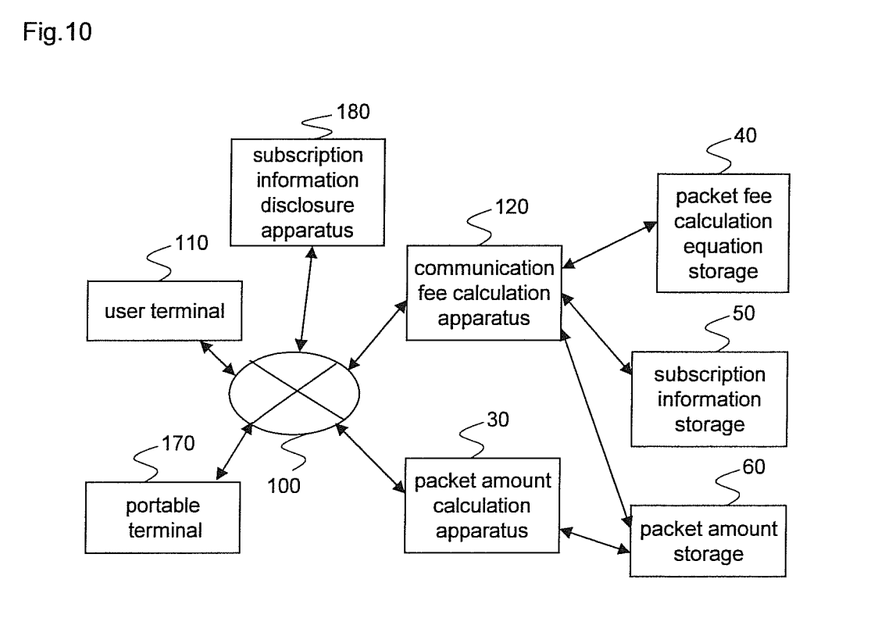
FIG. 10 is a block diagram showing an exemplary configuration of an information processing system according to a second exemplary embodiment.

FIG. 10 is a block diagram showing an exemplary configuration of the information processing system according to this exemplary embodiment. Components similar to those of the first exemplary embodiment are designated the same reference numerals, and detailed descriptions thereon are omitted.

As shown in FIG. 10, the information processing system of this exemplary embodiment comprises communication fee calculation apparatus 120, packet amount calculation apparatus 30, packet fee calculation equation storage 40, subscription information storage 50, packet amount storage 60, and apparatus 180 which discloses subscription information through network 100. Hereinafter, apparatus 180 is called "subscription information disclosure apparatus 180".

Communication fee calculation apparatus 120, packet amount calculation apparatus 30, and subscription information disclosure apparatus 180 are communicably interconnected through network 100. Packet amount storage 60 is connected to communication fee calculation apparatus 120 and packet amount calculation apparatus 30, respectively. Packet fee calculation equation storage 40 and subscription information storage 50 are connected to communication fee calculation apparatus 120. Also, user terminal 110 and portable terminal 170 used by the user are connected to network 100.

User terminal 110 is similar in configuration to user terminal 10 described in the first exemplary embodiment. Therefore, here, other functions added to the functions of user terminal 10 will be described. Control unit 14 transmits a notification that it is permitted to disclose subscription information of portable terminal 170 to communication fee calculation apparatus 120 to subscription information disclosure apparatus 180 through communication unit 12.

Portable terminal 170 can be utilized instead of user terminal 110 by the user because portable terminal 170 comprises a configuration similar to user terminal 110. This exemplary embodiment is described in a case where the user operates portable terminal 170.

Communication fee calculation apparatus 120 is an information processing apparatus such as a workstation, a server or the like, which is provided in a company to which the user belongs. Communication fee calculation apparatus 120 is similar to the configuration shown in FIG. 3, except for processing contents executed thereby, as compared with communication fee calculation apparatus 20 in the first exemplary embodiment. Here, the configuration of communication fee calculation apparatus 120 is described with reference to the block diagram shown in FIG. 2.

Control unit 22 of communication fee calculation apparatus 120 extracts a period which includes the date and time at which portable terminal 170 performed a communication, from packet amount storage 60. Control unit 22 transmits a notification of requesting subscription information of portable terminal 170 in the extracted period to subscription information disclosure apparatus 180 through communication unit 21. Hereinafter, the notification is called "request notification". Upon transmitting the request notification to subscription information disclosure apparatus 180, control unit 22 adds authentication information to prove that itself is communication fee calculation apparatus 120 in the message of the request notification.

Upon receipt of the subscription information from subscription disclosure unit 180, control unit 22 records the received subscription information in subscription information storage 50. Control unit 22 refers a calculation equation recorded in packet fee calculation equation storage 40, subscription information recorded in subscription information storage 50, and packet amount information recorded in packet amount storage 60, and then calculates a packet communication fee.

Figure 11:
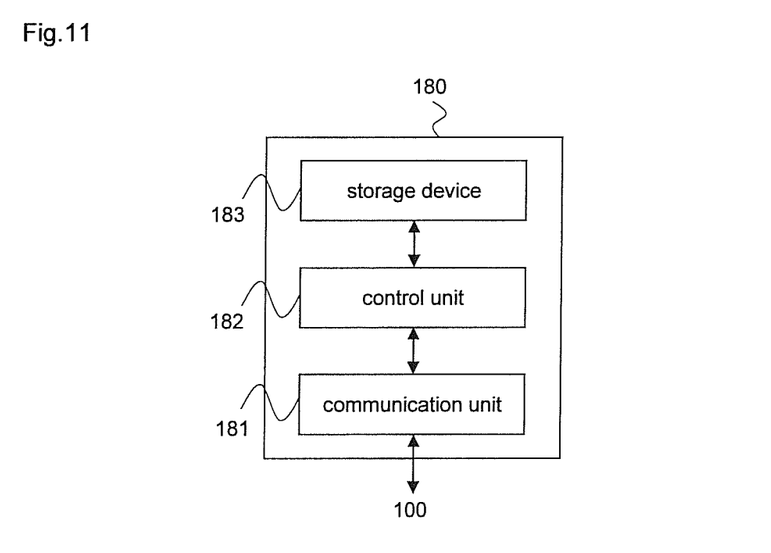
FIG. 11 is a block diagram showing an exemplary configuration of a subscription information disclosure system.

FIG. 11 is a block diagram showing an exemplary configuration of the subscription information disclosure apparatus.

Subscription information disclosure apparatus 180 is an information processing apparatus such as a work station, a server or the like, which is provided in the portable telephone company. As shown in FIG. 11, subscription information disclosure apparatus 180 comprises communication unit 181, storage device 183, and control unit 182.

Storage device 183 previously stores subscription information by the subscriber of portable terminal 170. Alternatively, instead of storing the subscription information in storage device 183, the subscription information may be stored in another storage apparatus provided in the portable telephone company such that subscription information disclosure apparatus 180 accesses to the storage apparatus.

Communication unit 181 receives the subscription information of portable terminal 170 from portable terminal 170 through network 100. Communication unit 181 receives a permission notification which is a notification that the subscription information of portable terminal 170 is permitted to be disclosed to communication fee calculation apparatus 120 from portable terminal 170 through network 100. Communication unit 181 receives a request notification for subscription information of portable terminal 170 and that is valid during a specified period from communication fee calculation apparatus 120.

Control unit 182 comprises a CPU (not shown) for executing predetermined processing in accordance with a program, and a memory (not shown) for storing the program.

Control unit 182 performs authentication processing as to whether the received permission notification has been transmitted from portable terminal 170. When the authentication has been confirmed without problem, control unit 182 prepares to disclose the subscription information of portable terminal 170, stored in storage device 183, to communication fee calculation apparatus 120. Control unit 182 performs authentication processing as to whether the received request notification has been transmitted from communication fee calculation apparatus 120.

Control unit 182 confirms whether or not the subscription information of portable terminal 170 can be disclosed to communication fee calculation apparatus 120. When it can be disclosed, control unit 182 reads information corresponding to a specified period from the subscription information of portable terminal 170 in storage device 183 and transmits it to communication fee calculation apparatus 120 through communication unit 181.

Next, a description will be given of the operation of the information processing system configured as described above.

Figure 12:
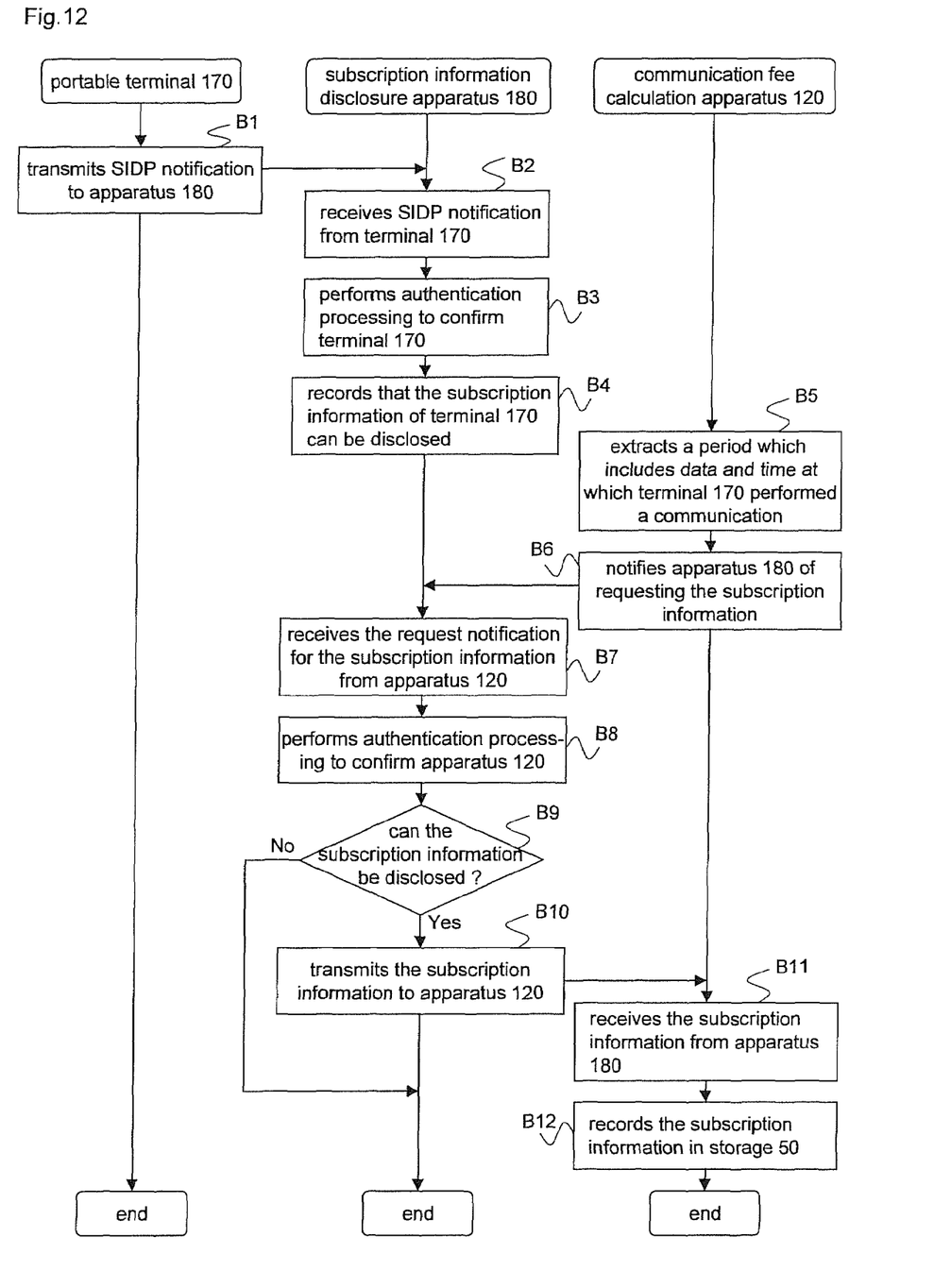
FIG. 12 is a flow chart showing an operation procedure of the information processing system according to the second exemplary embodiment.

FIG. 12 is a flow chart showing an operation procedure of the information processing system according to this exemplary embodiment. It is assumed herein that the user of portable terminal 170 has previously changed a new subscription course, and changed contents which include information on the subscription course and the date of starting the course has been registered on subscription information storage 50 in the portable telephone company.

As shown in FIG. 12, the user of portable terminal 170 operates portable terminal 170, and makes portable terminal 170 transmit subscription information disclosure permission notification that the user permits to disclose the subscription information of portable terminal 170 to communication fee calculation apparatus 120 to subscription information disclosure apparatus 180 (step B1). Hereinafter, subscription information disclosure permission notification is called "SIDP notification".

The SIDP notification includes information (identifier) which can uniquely identify communication fee calculation apparatus 120 to which the subscription information can be disclosed.

Specifically, the IP address, previously assigned ID/password, and the like of communication fee calculation apparatus 120 can be used for the identifier. This identifier corresponds to the authentication information of communication fee calculation apparatus 120. Also, the SIDP notification also includes authentication information for confirming that portable terminal 170 which has transmitted the notification is the terminal of the subscriber. For example, the authentication information of the subscriber is a password previously registered by the user.

Upon receipt of SIDP notification from portable terminal 170 (step B2), subscription information disclosure apparatus 180 performs authentication processing to determine whether or not the received SIDP notification has been transmitted from portable terminal 170 (step B3). When the authentication is confirmed without problem, subscription information disclosure apparatus 180 records that the subscription information of portable terminal 170 can be disclosed to communication fee calculation apparatus 120 (step B4).

Communication fee calculation apparatus 120 extracts a period which includes date and time at which portable terminal 170 performed a communication from information recorded in packet amount storage 60 at a predetermined timing (step B5). The predetermined timing may be the same as or different from timing at which a communication fee is calculated, or timing at which the user changes a subscription course, such as once a month, once a week, everyday, or the like.

Subsequently, communication fee calculation apparatus 120 accesses subscription information disclosure apparatus 180, and notifies subscription information disclosure apparatus 180 of requesting the subscription information of portable terminal 170 in the extracted period (step B6). The notification also includes authentication information that itself is communication fee calculation apparatus 120.

Upon receipt of the notification of requesting the subscription information from communication fee calculation apparatus 120 (step B7), subscription information disclosure apparatus 180 performs authentication processing to determine whether or not the received notification has been transmitted from communication fee calculation apparatus 120 (step B8). When the authentication is confirmed without problem, subscription information disclosure apparatus 180 confirms whether or not the subscription information of portable terminal 170 can be disclosed to communication fee calculation apparatus 120 (step B9).

When it can be disclosed, subscription information disclosure apparatus 180 refers the subscription information of portable terminal 170 in storage device 183, and transmits the subscription information in the period specified by the request notification to communication fee calculation apparatus 120 (step B10).

Upon receipt of the subscription information from subscription information disclosure apparatus 180 (step B11), communication fee calculation apparatus 120 records the received subscription information in subscription information storage 50 (step B12). Conversely, when the subscription information cannot be disclosed at step B9, the processing is terminated.

Subsequently, as the user utilizes portable terminal 170 for business, packet amount calculation apparatus 30 calculates a packet amount for business use in portable terminal 170, and records the packet communication amount calculated as business use, the date and time at which the communication was performed, and the identifier of portable terminal 170 in packet amount storage 60 in association with one another in a manner similar to the procedure shown in FIG. 8. Further, communication fee calculation apparatus 120 calculates a communication fee utilized for business by portable terminal 170 in a manner similar to the procedure shown in FIG. 9.

Like the first exemplary embodiment, the functions of communication fee calculation apparatus 20 and packet amount calculation apparatus 30 may also be integrated into a single information processing unit in this exemplary embodiment. Also, one storage apparatus may store information on the three storage devices, i.e., packet fee calculation equation storage 40, subscription information storage 50, and packet amount storage 60. Also, an information processing apparatus may comprise the functions of communication fee calculation apparatus 120 and packet amount calculation apparatus 30 and a storage device which integrates information on these storage devices. What form of the system is determined by which apparatus the portable telephone company manages.

Also, the user may utilize user terminal 110 instead of portable terminal 170 in the procedure shown in FIG. 12.

Next, effects of this exemplary embodiment will be described. The following effects are produced in addition to the effects of the first exemplary embodiment.

The user is only required to initially notify that he permits the disclosure of the subscription information to the subscription information disclosure apparatus without performing change registration processing to the communication fee calculation apparatus, even when a subscription course is changed, thus improving the convenience of the user.

Update registration of subscription information by the user himself is susceptible to forgotten input, input error, and misrepresentation. On the other hand, in this exemplary embodiment, such a possibility becomes lower because information from the portable telephone company is utilized, thus making it more correctly calculate a communication fee.

Other than the effects described above, even when the user of a portable telephone changes a service course associated with the change of the portable telephone company, the present invention can calculate communication fees before and after the course change corresponding to the courses. Also, a company other than a portable telephone company can also provide a separate calculation service.

The communication fee calculation method of the present invention may be described in a program for causing a computer to execute, and the computer may be caused to execute the method of the present invention.

The present invention according to the exemplary embodiments described above can be applied to applications in which portable terminals of individuals are used for business, where a communication fee (for example, that is a packet communication fee) spent for business use is charged on an company to which users belong, while that spent for private use is charged on the individuals. Otherwise, the present invention can be applied to an application in a marketing system or the like intended to consumers, where communication fees spent for replies to surveys, browsing of advertisements, and the like using portable telephones are charged on a surveyor (for example, that is a company).

An exemplary advantage according to the present invention is, in a system for realizing a business/private separate calculation, that a communication fee is calculated from subscription information after an update or subscription information before the update corresponding to the date and time at which a communication was performed with an information terminal. It is therefore possible to calculate a communication fee for business use in a particular utilization form with a value equivalent to an actually charged communication fee. Also, even if the telephone company of an information terminal is changed or a separate calculation service course is changed, communication fees before and after the course change can be calculated corresponding to the course utilized.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An information processing system for calculating a communication fee in a particular utilization form among a plurality of utilization forms of an information terminal, said system comprising:

an information processing apparatus including a first storage device storing calculation equations for calculating said communication fee corresponding to an identifier of said information terminal regarding first and second subscription courses whose said particular utilization forms are different each other, and storing first subscription information including information on a date and time of starting said first subscription course, and a first control unit; and an information disclosure apparatus connected to said information processing apparatus through a network, including a second storage device storing second subscription information including information that said second subscription course will be selected instead of said first subscription course corresponding to said identifier of said information terminal and a date and time of starting said second subscription course, and a second control unit, wherein said second control unit, upon receipt of a notification that disclosure of said second subscription information is permitted from said information terminal through said network, transmits said second subscription information to said information processing apparatus, said first control unit, upon receipt of said second subscription information from said information disclosure apparatus, stores said second subscription information in said first storage device, said first control unit records a communication amount by a communication in said particular utilization form performed by said information terminal and a communication date and time which indicates a date and time at which said communication has been performed in said first storage device, said first control unit determines whether or not said communication date and time is before said date and time of starting said second subscription course, and calculates said communication fee by using said communication amount and a calculation equation for said first subscription course when said communication date and time is before said date and time of starting said second subscription course, or calculates said communication fee by using said communication amount and a calculation equation for said second subscription course when said communication date and time is at or after said date and time of starting said second subscription course.

2. A method by an information processing apparatus for calculating a communication fee in a particular utilization form among a plurality of utilization forms of an information terminal and an information disclosure apparatus connected to said information processing apparatus through a network, said method comprising:

said information processing apparatus storing calculation equations for calculating said communication fee corresponding to an identifier of said information terminal regarding first and second subscription courses whose said particular utilization forms are different each other, and first subscription information including information on a date and time of starting said first subscription course, in a first storage device;

said information disclosure apparatus storing second subscription information including information that said second subscription course will be selected instead of said first subscription course corresponding to an identifier of said information terminal and a date and time of starting said second subscription course in a second storage device;

said information disclosure apparatus transmitting said second subscription information to said information processing apparatus upon receipt of a notification that disclosure of said second subscription information is permitted from said information terminal through said network;

said information processing apparatus, upon receipt of said second subscription information from said information disclosure apparatus, storing said second subscription information in said first storage device;

said information processing apparatus recording a communication amount by a communication in said particular utilization form performed by said information terminal and a communication date which indicates a date and time at which said communication has been performed in said first storage device; and said information processing apparatus determining whether or not said communication date and time is before said date and time of starting said second subscription course, calculating said communication fee by using said communication amount and a calculation equation for said first subscription course when said communication date and time is before said date and time of starting said second subscription course, or calculating said communication fee by using said communication amount and a calculation equation for said second subscription course when said communication date and time is at or after said date and time of starting said second subscription course.

* * * * *